United States Patent [19]

Matsumura et al.

[11] Patent Number: 4,898,793
[45] Date of Patent: Feb. 6, 1990

[54] FUEL CELL DEVICE

[75] Inventors: Mitsuie Matsumura; Toshihide Tanaka; Hiroaki Urushibata; Kazunao Sato, all of Amagasaki, Japan

[73] Assignee: Mitsubishi Denki Kabushiki Kaisha, Japan

[21] Appl. No.: 265,815

[22] Filed: Nov. 1, 1988

[30] Foreign Application Priority Data

Nov. 4, 1987 [JP] Japan .................. 62-277496
Nov. 20, 1987 [JP] Japan .................. 62-291870

[51] Int. Cl.$^4$ .................. H01M 8/04; H01M 8/14
[52] U.S. Cl. .................. 429/38; 429/16; 429/22
[58] Field of Search .................. 429/38, 34, 39, 13, 429/14, 16, 22-25

[56] References Cited

U.S. PATENT DOCUMENTS 4,530,887 7/1985 Maru et al. .................. 429/16
4,572,876 2/1986 Spurrier .................. 429/14 X
4,643,954 2/1987 Smith .................. 429/16 X

FOREIGN PATENT DOCUMENTS 61-24159 2/1986 Japan .
62-160670 7/1987 Japan .

Primary Examiner—Anthony Skapars
Attorney, Agent, or Firm—Leydig, Voit & Mayer

[57] ABSTRACT

A fuel cell device individually has an electrolyte layer which is connected, in an ion conductive manner, to the electrolyte layer of a fuel cell and a half cell formed by a single electrode and a gas chamber.

An electrochemical circuit for the purpose of transferring electrolyte is provided by using the single electrode of the half cell, the electrolyte layer of the corresponding fuel cell and the half cell, and either of an oxidant gas side electrode or a fuel gas side electrode. With this circuit, quick and quantitative replenishing electrolyte can be performed.

25 Claims, 8 Drawing Sheets

FUEL CELL DEVICE

BACKGROUND OF THE INVENTION

1. Field of the Invention

This invention relates to a fuel cell device, and more particularly to a fuel cell device having an electrolyte replenishing function capable of realizing an easy and effective replenishment of electrolyte.

2. Related Art Statement

FIG. 1 is a perspective view, a part of which is omitted, illustrating an example of the general structure of a molten carbonate type of fuel cell device. A fuel cell device of the type described above comprises a fuel cell stacked body that is structured in such a manner that single fuel cells 4 (to be called "cells" hereinafter) are stacked with separator members interposed therebetween. The cell 4 comprises an oxidant gas side electrode 1, a fuel gas side electrode 2, and an electrolyte layer 3 which is interposed therebetween. A positive side terminal member 6a and a negative side terminal member 6b are mounted on the corresponding positive side end and negative side end portions. The above-described positive side terminal and the negative side terminal members 6a and 6b and the separator member 7 each has a gas impermeability, and form reaction gas flow lines 81a and 81b for supplying an oxidant gas and a fuel gas to the oxidant gas side electrode 1 and the fuel gas side electrode 2, respectively. These members 6a, 6b and the separator member 7 each has an electron conductivity so that they act to electrically connect the cells 4 in a series. The side surfaces of the stacked body 5 are provided with gas manifolds 8a and 8b for distributing and supplying (or discharging) that oxidant gas and the fuel gas to the corresponding reaction gas flow lines 81a and 81b. A gasket 9 is interposed between the stacked body 5 and the gas manifolds 8a and 8b to be abutted against each other. An arrow A in the figure designates the oxidant gas flow, while an arrow B designates the fuel gas flow.

FIG. 2 shows a separator member 7a for replenishing electrolyte to which a replenishing pipe 10 is connected, this replenishing pipe 10 replenishing electrolyte from outside of the fuel cell device into the electrolyte layer 3 which is disclosed, for example, in Japanese Patent Laid-Open No. 61-24159. A fuel cell device in which electrolyte can be replenished from outside thereof can be obtained by using the separator member 7a for replenishing electrolyte as the separator member 7.

An operation of the fuel cell device will now be described.

The electrolyte layer 3 in a molten carbonate type of fuel cell is constituted in such a manner that a substance (such as $LiKCO_3$) which acts as the electrolyte is retained in a porous structure made of a material (such as $LiAlO_2$) which is chemically stable and which has electrical insulation. It therefore acts as the electrolyte layer of a fuel cell and also acts as a gas separator layer for preventing mixing of the fuel gas to be supplied to the fuel gas side electrode and the oxidant gas to be supplied to the oxidant gas side electrode. If the quantity of the electrolyte contained in the electrolyte layer 3 becomes lacking for some reason, the internal resistance of the cell increases, causing for the cell characteristics to be deteriorated. If it becomes depleted excessively, the gas separating function becomes insufficient, causing the operation of the fuel cell to become difficult because of the resulting partial mixing of the fuel gas and the oxidant gas.

In an actual molten carbonate type of fuel cell since the electrolyte diminishes from the electrolyte layer as the cell works, the insufficient quantity of the electrolyte causes the life of the fuel cell to be restricted because of the above-described reason. For example, the life test to which a cell is subjected resulted substantially in 10,000 hours, and the same to a stacked battery resulted in substantially 5,000 hours. Therefore, it is critical for lengthening the life of the fuel cell and improving the characteristics of the same to prevent depletion of the electrolyte in the electrolyte layer by some measures.

The effect obtained by replenishing the electrolyte performed in the life test for the cell was, as shown in FIG. 3, confirmed by a group including an inventor of the present invention. That is, in this test, it was confirmed that replenishment of electrolyte was effective since the internal resistance was successively reduced and the electrical characteristics were improved. In this test, a first replenishment of the electrolyte was, as designated by a symbol A in FIG. 3, performed 3,200 hours after the start of operation and the second replenishment was, as designated by a symbol B in FIG. 3, performed 5,500 hours after the same.

However, in a conventional device which is, as shown in FIG. 2, constructed in such a manner that the electrolyte is directly replenished from outside to the electrolyte layer 3 of each cell 4 by means of a replenishing pipe 10 which is provided for each separator member 7a, although an excellent replenishment of the electrolyte can be effected similarly to the test result shown in FIG. 3, the structure of the stacked layer becomes excessively complicated.

Since the conventional fuel cell device is structured as described above, problems arise in that the structure of the stacked body is too complicated, causing the whole stacked body to be made thin, and cost to become great. Furthermore, since electrolyte needs in be replenished to each of the cells, the replenishing work becomes complex.

FIG. 4 is a cross-sectional view illustrating an example of a fuel cell device comprising the conventional cells of a type disclosed in Japanese Patent Laid-Open No. 62-98568.

Referring to this figure, a cell 4 comprises, similar to the device shown in FIG. 1, an oxidant gas side electrode 1, fuel gas side electrode 2, and electrolyte layer 3. The cell 4 is sandwiched by cell frames 11, and collector plates 12 are each disposed between the cell frame 11 and the electrode 1 or 2. A surface where the electrolyte layer 3 and the cell frame 11 are positioned in contact with each other is provided with a wet seal 13. An electrolyte retaining member 14 for retaining excessive electrolyte is accommodated in an electrolyte stoking space 15 disposed in the edge portion 11a of the cell frame 11.

FIG. 5 is a cross-sectional view illustrating another example of a fuel cell device which is similar to that shown in FIG. 4 and which comprises the conventional cells of a type disclosed in Japanese Patent Laid-Open No. 62-98568. An electrolyte replenishing pipe 10 for replenishing, via the wet seal portion 13, electrolyte from outside to the electrolyte layer 3 is provided. The remainder structure is constructed similarly to the conventional device shown in FIG. 4.

As described above, replenishment of electrolyte has received growing interest as means for preventing depletion of electrolyte, and a variety of methods of replenishing the electrolyte and the replenishing structures have been examined.

Referring to FIG. 4, the electrolyte retaining member 14 is a member constituted in such a manner that a surplus electrolyte is retained in a porous body such as zirconia felt. When the electrolyte retained in the electrolyte layer 3 becomes depleted, the surplus electrolyte contained in the electrolyte retaining member 14 is first moved to the electrolyte layer of the wet seal 13, next it is distributed over the entire surface of the electrolyte layer 3 due to the capillary phenomenon so that electrolyte replenishment is performed.

At this time, the force to cause the electrolyte to be moved is the difference in the electrolyte retaining force between the electrolyte layer 3 and the electrolyte retaining member 14, and the electrolyte retaining force between the portion of the electrolyte layer 3 lacking in the electrolyte and the portion of the same which sufficiently retains the electrolyte. The difference in the electrolyte retaining force can be obtained by an arrangement conducted in such a manner that the diameter of the small apertures in the electrolyte layer 3 is made smaller than that of the electrolyte retaining member 14.

In FIG. 5, the electrolyte which has been replenished, through the electrolyte replenishing pipe 10, to the electrolyte layer adjacent the wet seal portion 13 is distributed to the portion lacking electrolyte in the electrolyte layer 3 due to the capillary phenomenon so that electrolyte replenishment is performed.

The above described methods of replenishing electrolyte is based on the following two phenomena:

(1) The distribution of the electrolyte in a plurality of porous bodies in an equilibrium state is defined by the electrolyte retaining force of each porous body.

(2) The movement of the electrolyte is a capillary phenomenon based on the electrolyte retaining force.

The conventional electrolyte replenishing means that is based on the above-described phenomena can be effected in small cells having the effective electrode area of, for example, 300 cm$^2$. However, the following problems arise when a large and long life fuel cell is intended.

(1) The electrolyte retaining force which defines the distribution of the electrolyte can be generally obtained by arranging the small apertures distribution in the porous body which retains the electrolyte. However, since aperture distribution arrangement is difficult and this distribution is changed due to sintering and conversion of the crystal structure, it is difficult for the electrolyte retaining force to be stably controlled for a long time.

(2) Since the movement of the electrolyte is due to the capillary phenomenon, the moving speed is insufficient. The moving speed of the electrolyte greatly depends upon the composition of the electrolyte, the diameter of the small apertures in the electrolyte layer, and the temperature. For example, it takes substantially 1000 hours for the electrolyte to be moved through an electrolyte layer of 30 cm. Since the time required for an electrolyte to be moved through a predetermined length is proportional to the square of the distance of movement, this raises a problem when a large size fuel cell is intended.

(3) For the above-described two reasons, it is difficult for the effective degree of replenishment of the electrolyte which has been replenished from outside to be quantitatively assayed.

Since the fuel cell device having the conventional electrolyte replenishing function is constructed as described above, it is difficult to quickly, uniformly and effectively replenish the electrolyte and a stable and constant electrolyte replenishment cannot be conducted over a long time when the battery has a large size and long life.

SUMMARY OF THE INVENTION

It is therefore an object of the present invention to provide a fuel cell device capable of overcoming the above described problems. The device has an electrolyte replenishment function which realizes quick, uniform effective replenishment of electrolyte and in which electrolyte can be stably replenished over a long time period with the quantity of electrolyte replenishment acknowledged, even if in a large size fuel cell.

The device according to the present invention comprises: a fuel cell including an oxidant gas side electrode and a fuel gas side electrode which are disposed away from each other, and an electrolyte layer sandwiched therebetween; a half cell including an electrolyte layer, a single electrode and a gas chamber; a connecting electrolyte layer for connecting, in an ion conductive manner, the electrolyte layer of the fuel cell and the electrolyte layer of the half cell; and a electrochemical circuit which is formed by a single electrode of the half cell and either of the electrodes of the fuel cell, and which electrochemically transfers the electrolyte between the fuel cell and the half cell, whereby the quantity or the composition of the electrolyte contained in the fuel cell is maintained by the transference of the electrolyte.

Another fuel cell device according to the present invention comprising: a fuel cell stacked body formed by stacking single cells with separator members sandwiched therebetween, each of the single cells having an electrolyte layer, an oxidant gas side electrode disposed on one side of the electrolyte layer and a fuel gas side electrode disposed on the other side of the electrolyte layer; a positive terminal member and a negative terminal member which are disposed on the corresponding positive terminal and negative terminal which terminals are disposed along the direction of stacking the stacked body; means for supplying an oxidant gas via a gas manifold to each single cell of the fuel cell; electrolyte replenishing means for replenishing electrolyte to the single cell which is located at the most positive end portion of the stacked body; and a connecting bridge for connecting neighboring electrolyte layers of the single cell in an ion conductive manner, the connecting bridge having ion conductivity capable of transferring the electrolyte which has been replenished by the electrolyte replenishing means to the negative terminal portion.

DESCRIPTION OF PREFERRED EMBODIMENTS

Figure 1:
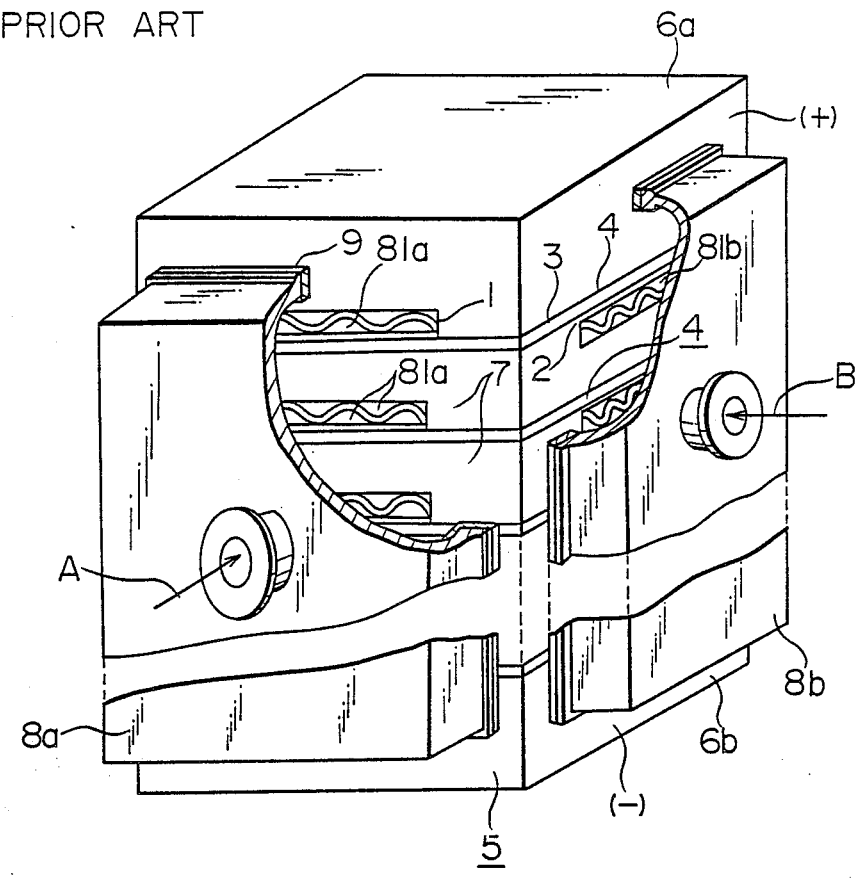
FIG. 1 is a perspective view, a part of which is omitted, illustrating an essential portion of a conventional fuel cell device.
Figure 2:
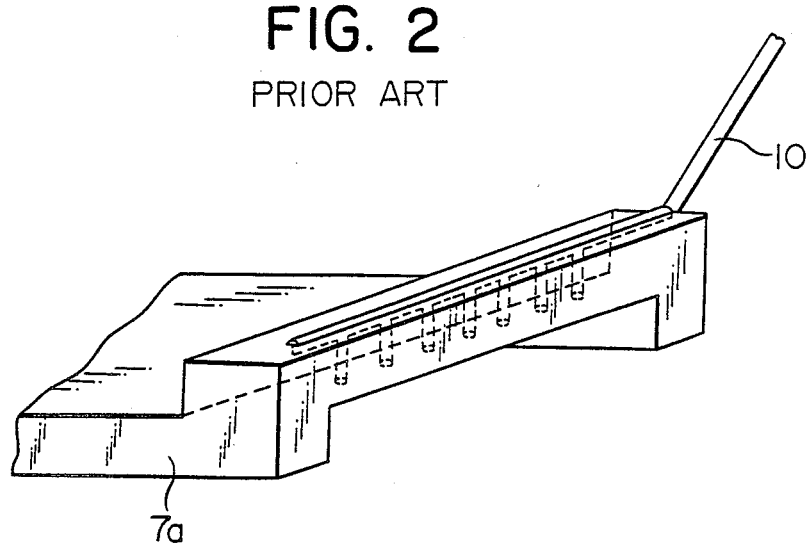
FIG. 2 is a perspective view illustrating an example of a conventional electrolyte replenishing means.
Figure 3:
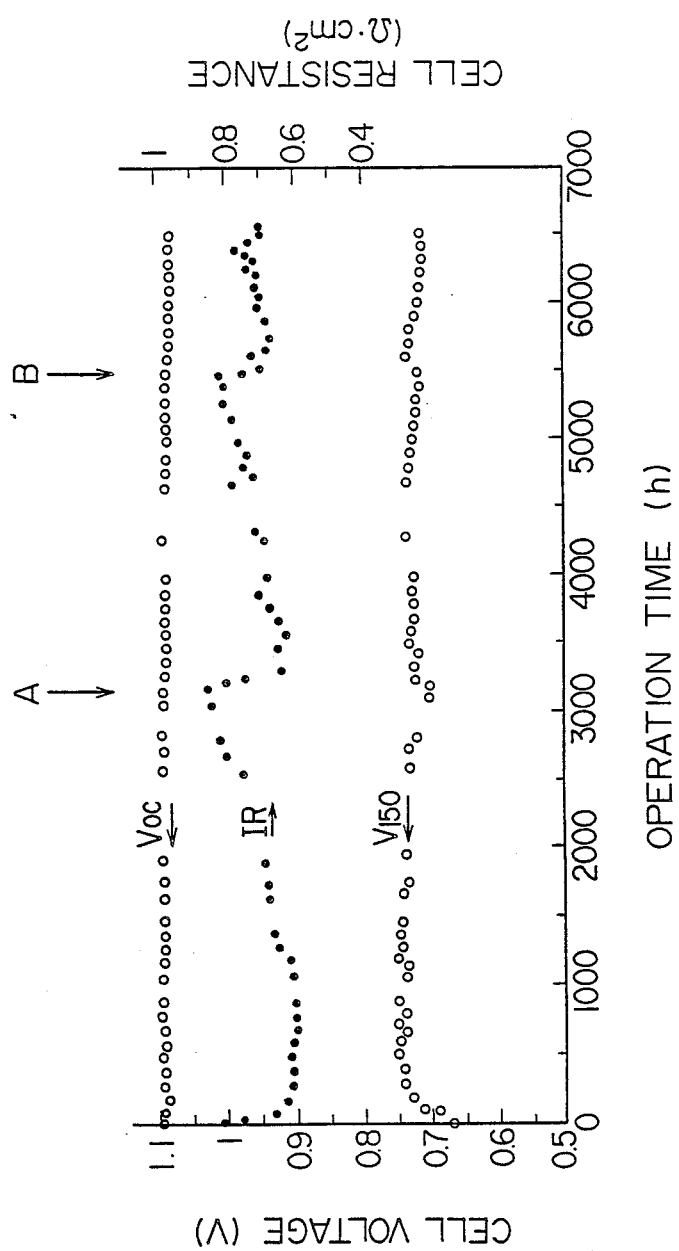
FIG. 3 is a characteristic view showing the result of a life test applied to a cell, the effect of the replenishment of the electrolyte on the characteristics of the fuel cell being examined.
Figure 4:
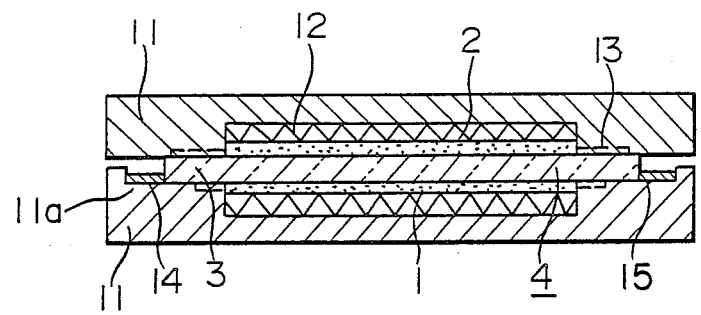
FIGS. 4 and 5 are cross-sectional views illustrating two conventional fuel cell devices, respectively.
Figure 5:
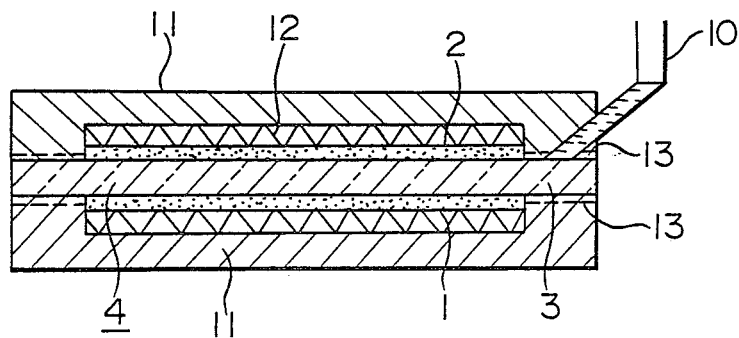
Figure 6:
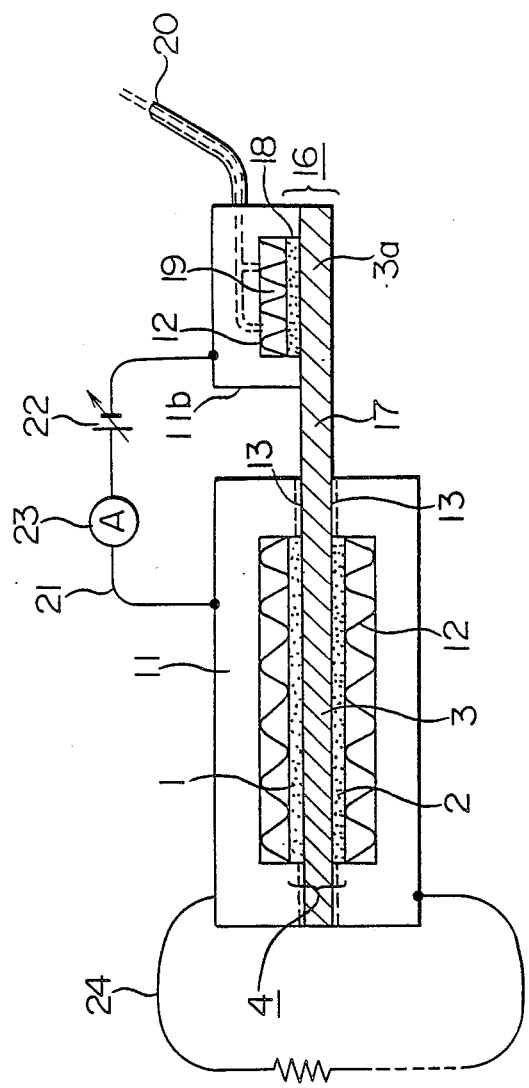
FIG. 6 is a schematic view illustrating the structure of a fuel cell device according to an embodiment of the present invention.

An embodiment of the present invention will now be described with reference to the accompanying drawings. FIG. 6 is a schematic structural view of a fuel cell device according to an embodiment of the present invention, in which electrolyte is replenished from a half cell to a single cell is described.

This fuel cell device provides a single cell as a fuel cell 4, this fuel cell 4 comprising an oxidant gas side electrode 1, a fuel gas side electrode 2 and an electrolyte layer 3 interposed therebetween. Surrounding this fuel cell 4 is provided a cell frame 11, and a wet seal 13 is provided between the cell frame 11 and the electrolyte layer 3. Current collecting plates 12 are disposed adjacent to the corresponding outer surfaces of the electrodes 1 and 2 in a contacting manner and in the cell frame 11.

A half cell 16 is disposed in an extension direction of the electrolyte layer 3 in the fuel cell 4, this half cell 16 comprises an electrolyte layer 3a which is ion-conductively connected, with a connecting electrolyte layer 17, to the electrolyte layer 3 in the fuel cell 4 and a single electrode 18 disposed adjacent to this electrolyte layer 3a. A current collecting plate 12 is disposed adjacent to the single electrode 18, and a cell frame 11b is disposed in such a manner that it surrounds this current collecting plate 12. A gas chamber 19 is formed between the cell frame 11b and the current collecting plate 12. The cell frame 11b is provided with an electrolyte replenishing pipe 20 for replenishing electrolyte. An electrochemical circuit 21 for transferring electrolyte is provided between the cell frame 11 and the cell frame 11b. This circuit 21 comprises a circuit-driving power source 22 and an ammeter 23. The fuel cell 4 is provided with a loading circuit 24 so that a direct output can be obtained from the fuel cell 4 by actuating this circuit 24.

An operation of this embodiment will now be described.

In FIG. 6, the half cell 16 and the electrochemical circuit 21 are provided in addition to the fuel cell 4 and the loading circuit 24 which form a usual fuel cell device.

The electrolyte layer 3a forming the half cell 16 is, for example, the same as the electrolyte layer 3 in the fuel cell 4. The single electrode 18 is a porous or non-porous electrode which is composed by in the main NiO, Cu and Au.

When the electrochemical circuit 21 is operated, the following reactions occur on the whole in the oxidant gas side electrode 1 and the single electrode 18:

in the oxidant gas side electrode 1;

$$\tfrac{1}{2}O_2 + CO_2 + 2e^- \rightarrow CO_3^{2-} \qquad (1)$$

in the single electrode 18;

$$CO_3^{2-} \rightarrow \tfrac{1}{2}O_2 + CO_2 + 2e^- \qquad (2)$$

With the progress of the reactions, positive ions such as $K^+$ and $Li^+$ which can be moved easier than the carbonic acid ion are moved in the main from the half cell 16 to the fuel cell 4 for the purpose of retaining the electrical neutrality of the electrolyte retained in the fuel cell 4 and that retained in the half cell 16, respectively. At this time, the connecting electrolyte layer 17 serves as a passage through which the ions pass.

As a whole, in this embodiment, the electrolyte is electrochemically transferred from the half cell 16 to the fuel cell 4 as a result of the operation of the electrochemical circuit 21. Therefore, the electrolyte to be replenished to the fuel cell 4 is first stored in the half cell 16, and it may be replenished to the fuel cell 4 as needed by operating the electrochemical circuit 21. In this embodiment, the electrolyte replenishing pipe 20 is provided for the purpose of replenishing the electrolyte to the half cell 16.

Since the moving speed of the electrolyte is proportional to the quantity of the electric current passing through the electrochemical circuit 21, the ammeter 23 is provided for the purpose of monitoring the moving speed of the electrolyte, that is, the quantity of the electric current. Furthermore, in this embodiment, the circuit driving power source 22 in the above circuit 21 is made to serve as a variable voltage type of direct current power source in order to control the quantity of electric current as needed.

According to this embodiment, carbonic acid ion is electrochemically generated on the entire surface of the oxidant gas side electrode 1, and the moving speed of the positive ions is more efficient with respect to the capillary phenomenon which performs the basic roll in the conventional replenishment of electrolyte. Therefore, relatively quick and uniform replenishment of electrolyte with respect to the convention device can be performed. Furthermore, the amount of movement of the electrolyte and the moving speed of the same can be controlled by measuring and controlling the electric current passing through the electrochemical circuit 21. The following methods are conventionally well known as means for detecting the quantity and the composition of the electrolyte contained in the fuel cell 4: a method of measuring the internal resistance of the fuel cell; a method of evaluating the rate of gas flow which penetrates the electrolyte layer 3; and a method of examining the operating condition dependency of the overvoltage of the reactions of the electrodes in the fuel cell. By using the above-described type of means with the present invention, a more effective control of the electrolyte can be conducted.

In the electrochemical circuit 21 shown in FIG. 6, electrolyte is replenished to the fuel cell 4 by providing the single electrode 18 with a more noble potential than that of the oxidant gas side electrode 1. On the other hand, in a case where electrolyte is intended to be partially removed from the fuel cell 4, it can be removed from the fuel cell 4 by connecting the polarity of the circuit driving power source 22 in the electrochemical circuit in a reversed manner to that conducted in the device shown in FIG. 6.

Figure 7:
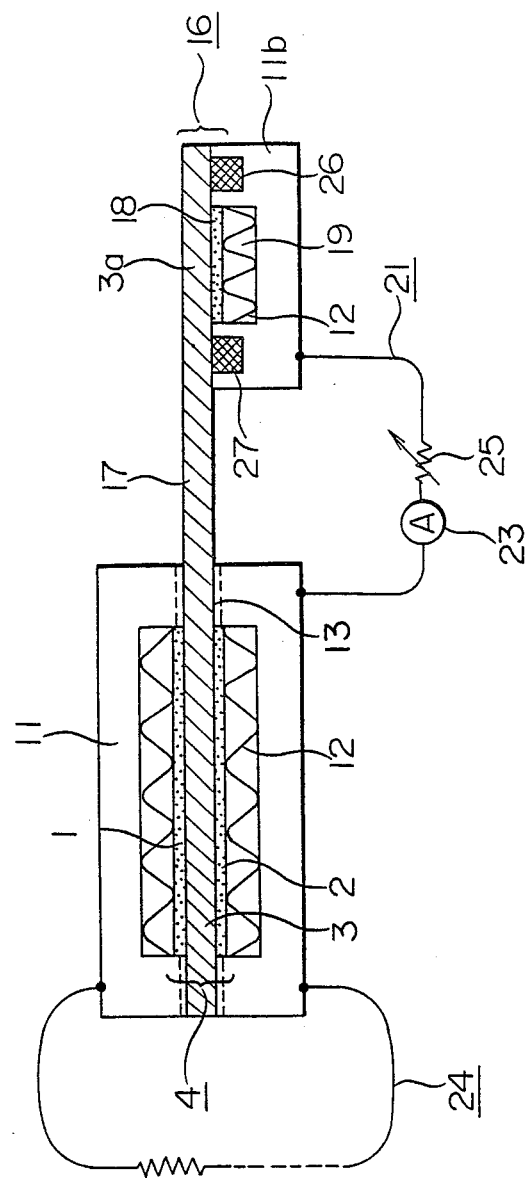
FIG. 7 is a schematic view illustrating the structure of a fuel cell device according to another embodiment of the present invention.

FIG. 7 is a schematic structural view of a fuel cell device according to another embodiment of the present invention illustrating a case where electrolyte is transferred from the fuel cell to the half cell.

In FIG. 7, the electromotive force of a cell is used as the circuit driving power source of the electrochemical circuit which transfers the electrolyte, this cell being formed in the electrochemical circuit and formed by the electrolyte layer and the single electrode of the half cell, the electrolyte layer and the electrode on the one side of the fuel cell.

In FIG. 7, such cell is formed in the electrochemical circuit 21 in addition to the fuel cell 4, this cell being formed by the fuel gas side electrode 2, single electrode 18 of the half cell 16, the electrolyte layer 3a of the half cell 16, the electrolyte layer 3 of the fuel cell 4, and the connecting electrolyte layer 17. The cell formed in this circuit 21 acts as the driving power source thereof.

Referring to FIG. 7, when a porous electrode which is in the main composed by NiO is used and a gas mixture composed in the main by oxygen and carbon dioxide is supplied to the gas chamber 19, the following reactions occur in the corresponding electrodes 2 and 18 so that electrolyte is transferred from the fuel cell 4 to the half cell 16:

in the fuel gas side electrode 2;

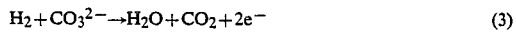

$$H_2 + CO_3^{2-} \rightarrow H_2O + CO_2 + 2e^- \quad (3)$$

in the single electrode 18;

$$\tfrac{1}{2}O_2 + CO_2 + 2e^- \rightarrow CO_3^{2-} \quad (4)$$

The speed at which the electrolyte is transferred is in proportional to the electric current passing through the electrochemical circuit 21. This speed can be easily adjusted by changing the composition of the gas to be supplied to the gas chamber 19, causing the electromotive force of the battery which acts as the driving power source of the circuit 21 to be changed or by adjusting a variable resistor 25 in the circuit 21 as shown in FIG. 7.

An electrolyte storage space 26 and an electrolyte retaining member 27 act as an electrolyte reservoir for stocking the surplus electrolyte which has been transferred or to be transferred.

In the present invention, it is a critical factor for electrochemically transferring the electrolyte to assure that the predetermined reactions progress as shown in equations (1), (2), (3), and (4) in the electrode portions in the electrochemical circuit 21.

Figure 8:
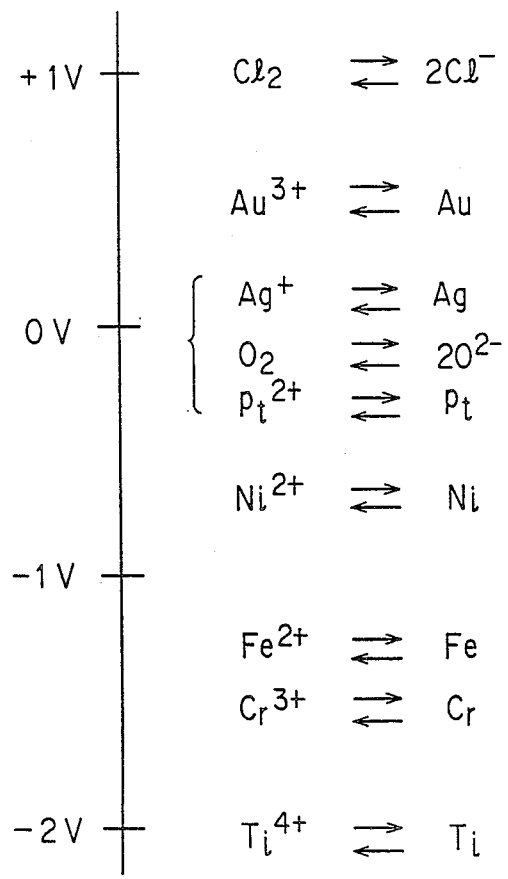
FIG. 8 shows the oxidation-reduction potential of each substance with respect to $O_2$, $CO_2/CO_3^{2-}$ electrodes.

If the operating conditions for the electrochemical circuit 21 are not suitable, undesirable subreactions such as solution of the components in the electrolyte can occur, and furthermore, pollution of the electrolyte and corrosion of the members can occur. Referring to FIG. 8, an example (Advances in Molten Salt Chemistry Vol. 4, (1981) Plenum Press, New York) of the oxidation-reduction potentials of a variety of substances with respect to an ($O_2$, $CO_2/CO_3^{2-}$) electrode are cited.

According to this figure, if the operating voltage for the circuit driving power source 22 shown in FIG. 6 exceeds, for example, 1 to 2 V, solution of Fe and Cr can occur. Therefore, it is preferable for the circuit driving power source 22 to be driven with a voltage below the above-described level.

In the above-described embodiment, although a case is described in which, in a single fuel cell, an electrochemical circuit which has a function of transferring electrolyte and which accompanies the fuel cell is employed, an electrochemical circuit may be provided in a fuel cell device in which plurality of single cells are stacked, this electrochemical circuit having a function of transferring electrolyte by way of respectively accompanying single or a plurality of the cells. It is a known fact that, in a fuel cell device in which a plurality of single cells are electrically connected to each other in a series, the single cell having the most positive potential becomes excessively lacking in the electrolyte with time, while the fuel cell which has the most negative potential increases electrolyte with time. Therefore, it is very effective for the fuel cell which is has the most positive or the most negative potential to be subjected to this embodiment.

In a case where two or more types of electrolyte are mixed with each other to be used as the electrolyte in the fuel cell, a specific electrolyte component sometimes diminishes excessively. In this case, the specific electrolyte component which has diminished needs to be in the main replenished in the fuel cell. Specifically, the specific electrolyte component which is intended to be transferred to the half cell is arranged to be in a greatest quantity.

Then, the other embodiment of the present invention will be described with reference to the drawings.

Figure 9:
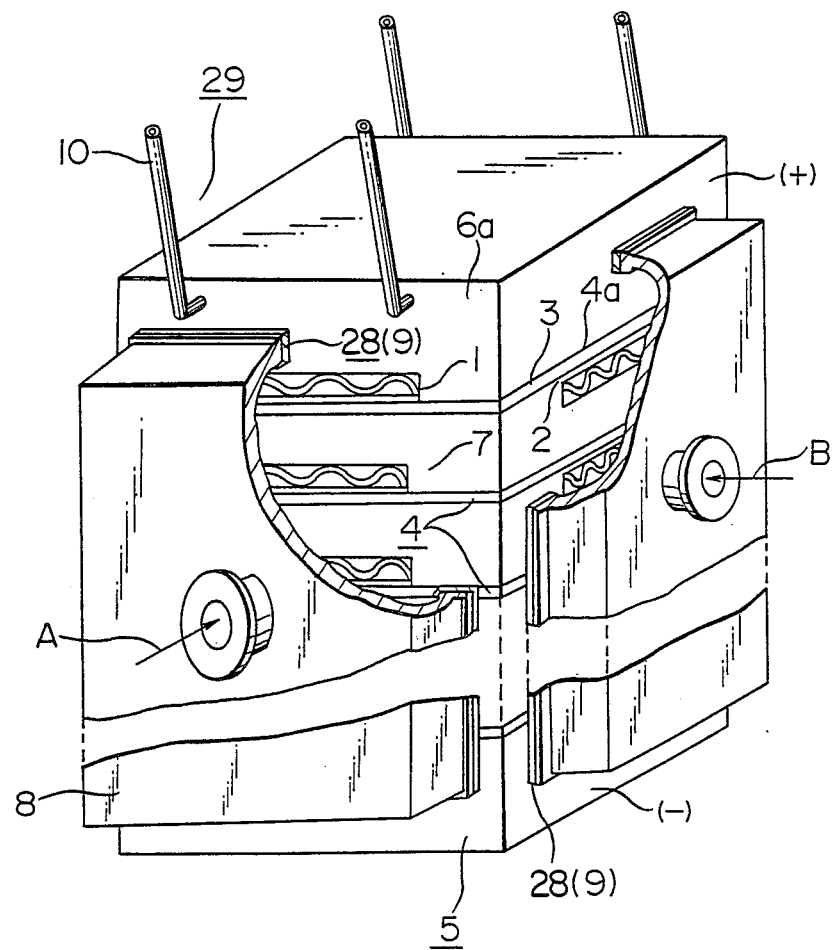
FIG. 9 is a perspective view, a part of which is omitted, illustrating an essential portion of a fuel cell device according to the other embodiment of the present invention.
Figure 10:
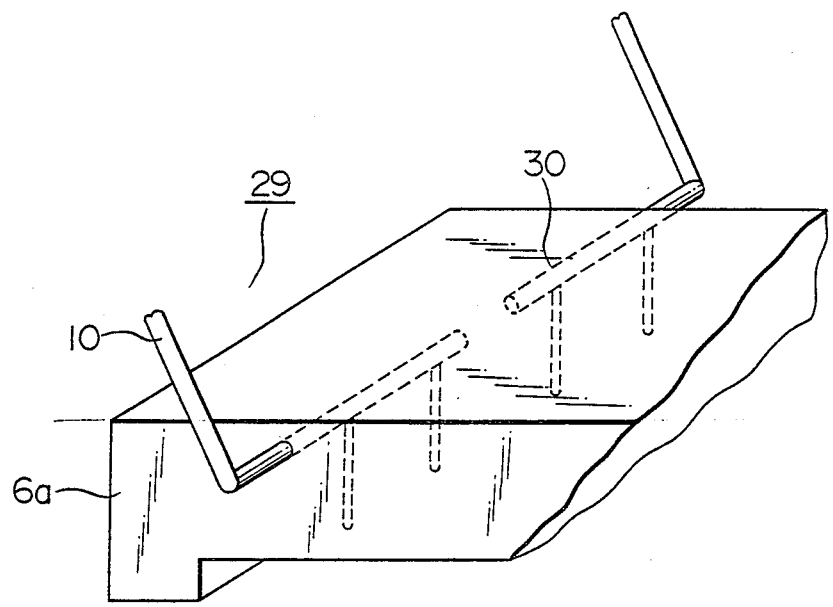
FIG. 10 is a perspective view illustrating the details of the positive side terminal member shown in FIG. 9.

In FIG. 9, on each side surface of the stacked body 5 is provided a connecting bridge 28 for electrically connecting, in an ion conductive manner, the neighboring electrolyte layers 3 of a plurality of stacked cells 4. In this embodiment, a gasket 9 serves as the connecting bridge 28. The connecting bridge 28 may be individually provided from the gasket 9. Reference numeral 29 represents electrolyte replenishing means for replenishing electrolyte to the cell 4a located in the most positive potential. The gasket 9 is constructed, for example, in such a manner that electrolyte contains zirconia dust, and it serves as the connecting bridge 15 having the ion conductivity. The electrolyte replenishing pipe 10 is provided for the positive side terminal member 6a disposed adjacent to the cell 4a which is located in the most positive potential (in the uppermost position in the figure). Electrolyte can be supplying to the electrolyte layer 3 via the oxidant gas side electrode 1 by supplied the electrolyte to this pipe 10 so that means 29 for replenishing electrolyte can be formed. The positive side terminal member 6a having the characteristic electrolyte replenishing function of the present invention is shown in FIG. 10. The electrolyte replenishing pipe 10 is connected to a replenishing hole 30 provided in the terminal member 6a so that electrolyte can be replenished from the oxidant gas flow line to the electrolyte layer 3 via the oxidant gas side electrode 1. Since the electrolyte (for example, $LiKCO_3$) is usually a solid body at low temperatures (for example at or near room temperature), the electrolyte replenishment can be further readily performed by the following methods: the electrolyte is powdered or granulated before it is supplied to the electrolyte replenishing pipe 10, and the electrolyte replenishing pipe 10 is vibrated; the electrolyte is liquefied by heating the electrolyte replenishing pipe 10 above the fusing point of the electrolyte; or the electrolyte replenishing pipe 10 and the replenishing hole 30 are inclined in order to make the liquefied electrolyte easily flow downwards.

With the electrolyte replenishing means 29 in this embodiment, the electrolyte supplied to the cell which has the most positive potential in the cell stacked body can effectively prevent the cell having the most positive potential from lacking in electrolyte, this cell having the most positive potential being the cell in which a lack of electrolyte most easily occurs. Therefore, propagation of the lacking in the electrolyte to the neighboring cell in the direction of the negative potential sequence can be prevented. Furthermore, since the thus-replenished electrolyte can be successively propagated in part to the other cells via the connecting bridge 28, the same effect as that obtained by replenishing the electrolyte to each cell can be obtained in the long term. As described above, the present invention provides a fuel cell device in which easy replenishment of electrolyte can be performed with only a simple structure, and which can operate with stable and excellent characteristics for long periods.

The following four factors can be exemplified which cause diminishment of the electrolyte from the electrolyte layer 3:

(1) vaporization of the electrolyte;
(2) consumption due to the corrosive reaction with the components of the fuel cell;
(3) oozing of the electrolyte into gaps; and
(4) electrochemical movement of the electrolyte due to generation of local single cell.

The inventors of the present invention measured the distribution of the content of the electrolyte in the fuel cell which has been subjected to a life test for the purpose of examining the relationship between the electrolyte consumption and each diminishing factor and the structure of each factor, resulting as follows:

(1) The major reason for the diminishment of the electrolyte observed in the single cell test lies in that the electrolyte is transferred due to local generation of a short circuit cell (for example, 50 to 60% of the overall amount of diminished electrolyte is due to the diminishment caused by electrochemical transference of the electrolyte).

(2) The electrolyte diminishing speed of the electrolyte in the cell stacked body is higher than that experienced with the single cell. The reason for this lies in that, since the gasket of the manifold provides the ion conductivity, the same effect as that obtained by connecting, with a bridge, the electrolyte layers of a plurality of cells can be obtained. Therefore, relatively many single cells having a short circuit therein are formed with respect to the single cell, causing the electrolyte to be transferred through the gasket of the manifold.

As a result of this, the diminished electrolyte and the deterioration of the characteristics in the fuel cell are first observed in the cell having the most positive polarity of a plurality of single cells which forms the stacked body of the fuel cell. Then, this phenomenon propagates to the adjacent single cell.

According to the present invention, lacking for electrolyte in the positive end cell and the propagation of the electrolyte to the neighboring cells in the negative potential direction due to the transference of the electrolyte can be effectively prevented.

Figure 11:
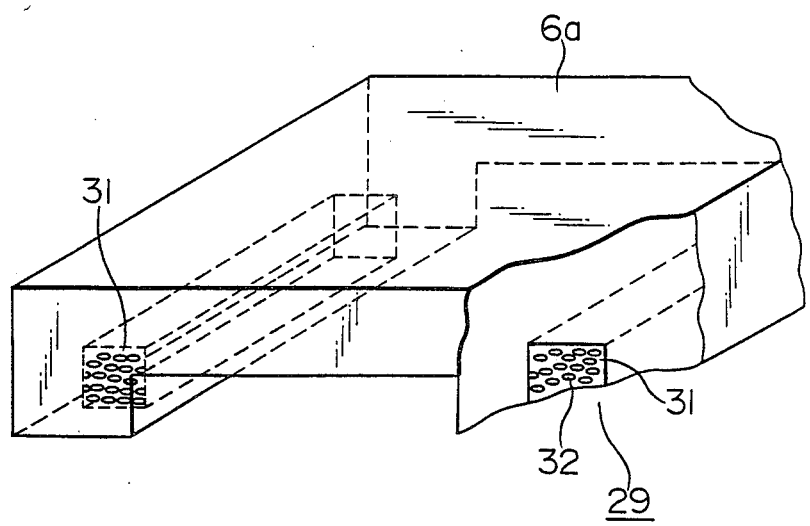
FIG. 11 is a perspective view illustrating an essential portion of fuel cell device according the another embodiment of the present invention.

In the above-described embodiment, the described as what is electrolyte replenishing means 29 is a passage through which the electrolyte is replenished and which is formed by using the electrolyte replenishing pipe 10 and the replenishing hole 30 for the purpose of replenishing the electrolyte from outside. This invention is not, of course, limited to this description. For example, a structure may be employed in which an electrolyte reservoir is used for excessively storing the electrolyte in the stacked body of the fuel cell for the purpose of supplying the electrolyte as needed to the single cell 4a. FIG. 11 shows an example of a case where an electrolyte reservoir is disposed in the positive terminal member 6a. Referring to this figure, the electrolyte which is first retained in a electrolyte retaining member 32 having a porous structure is moved to the electrolyte layer 3 when the electrolyte in the electrolyte layer 3 becomes lacking. Such movement of the electrolyte from an electrolyte reservoir 31 corresponding to the lack of the electrolyte in the electrolyte layer 3 can, as known, be realized by providing the diameter of the distributed small apertures in the electrolyte retaining member 32 to be greater than that of the distributed small apertures in the electrolyte layer 3 for the purpose of utilizing the capillary force. In this embodiment, the electrolyte replenishing means 29 is constructed from the electrolyte reservoir 31 and the electrolyte retaining member 32.

In the above-described embodiment, all of the descriptions made are for the case in which the gasket 9 serves as the connecting bridge 28 for the electrolyte in the outer manifold type of fuel cell device in which the gas manifold 8a is secured to the side surface of the fuel cell stacked body 5. However, the present invention can be applied to an internal manifold type of fuel cell device (omitted from illustration) which does not need any gasket by individually providing an electrolyte connecting bridge.

The electrolyte supplied having the cell 4a in the most positive potential is finally transferred to the most negative potential cell as a result of the action of the connecting bridge, as a result of which, the cell in the most negative cell exceeds in the electrolyte content over a long term. Therefore, it is preferable when the present invention is performed to simultaneously employ a structure in which the electrolyte which becomes excessive in a cell in the most negative potential can be absorbed. Specifically, this can be easily achieved by, in the cell having the most negative potential, providing an electrolyte reservoir for absorbing and retaining the electrolyte for either of the fuel gas side electrode or the oxidant gas side electrode, or by providing the above-described type of electrolyte reservoir for the negative terminal member.

What is claimed is:

1. A fuel cell device comprising:
    a fuel cell including an oxidant gas side electrode and a fuel gas side electrode which are disposed away from each other, and an electrolyte layer sandwiched therebetween;
    a half cell including an electrolyte layer, a single electrode and a gas chamber;
    a connecting electrolyte layer for connecting, in an ion conductive manner, said electrolyte layer of said fuel cell and said electrolyte layer of said half cell; and an electrochemical circuit which is formed by a single electrode of said half cell and either of said electrodes of said fuel cell, and which electrochemically transfers the electrolyte between said fuel cell and said half cell, whereby the quantity or the composition of the electrolyte contained in said fuel cell is performed by the transference of the electrolyte.

2. A fuel cell device according to claim 1 wherein said fuel cell comprises a molten carbonate type of fuel cell.

3. A fuel cell device according to claim 1 wherein said electrochemical circuit is actuated by the electromotive force generated in a cell formed by either of the electrodes of said fuel cell, said single electrode of said half cell, said electrolyte layer of said fuel cell and said half cell, and said connecting electrolyte layer.

4. A fuel cell device according to claim 1 wherein said electrochemical circuit is actuated by a direct current power source.

5. A fuel cell device according to claim 1 wherein adjustment of transference of the electrolyte is performed by means for controlling the quantity of electric current passing through said electrochemical circuit which is provided for the purpose of performing transference of the electrolyte.

6. A fuel cell device according to claim 1 wherein adjustment of the composition or the quantity of the electrolyte contained in said fuel cell is performed by means of adjusting the quantity of said electrolyte to be transferred.

7. A fuel cell device according to claim 5 wherein control of the quantity of electric current passing through said electrochemical circuit is performed by means of adjusting the voltage of said direct current power source.

8. A fuel cell device according to claim 5 wherein control of the quantity of electric current passing through said electrochemical circuit is performed by means of adjusting a variable resistor disposed in said electrochemical circuit.

9. A fuel cell device according to claim 5 wherein control of the quantity of electric current passing through said electrochemical circuit is performed by means of adjusting the composition of a gas in a gas chamber of said half cell.

10. A fuel cell device according to claim 1 wherein adjustment of the quantity or the composition of said electrolyte contained in said fuel cell is performed by means of conducting transference of said electrolyte from said fuel cell to said half cell.

11. A fuel cell device according to claim 10 wherein a fuel cell for adjusting the quantity or the composition of said electrolyte is located in the most negative potential side of said fuel cell which is formed by stacking said single cells so as to connect electrically in series.

12. A fuel cell device according to claim 1 wherein adjustment of the quantity or the composition of said electrolyte contained in said fuel cell is performed by conducting transference of said electrolyte from said half cell to said fuel cell.

13. A fuel cell device according to claim 12 wherein a fuel cell for adjusting the quantity or the composition of said electrolyte is located in the most positive potential side of said fuel cell.

14. A fuel cell device according to claim 1 wherein adjustment of the quantity or the composition of said electrolyte contained in said fuel cell is performed in accordance with the result of detection conducted by means for detecting the quantity or the composition of said electrolyte retained by said fuel cell.

15. A fuel cell device according to claim 14 wherein said means for detecting the quantity or the composition of said electrolyte comprises at least any of means for measuring the internal resistance of said fuel cell, means for evaluating the rate of gas flow passing through said electrolyte layer, and means for examining the operating condition dependency of the excessive voltage upon the reactions in said electrodes in said fuel cell.

16. A fuel cell device according to claim 1 wherein said half cell is provided with an electrolyte reservoir for retaining said electrolyte.

17. A fuel cell device according to claim 1 wherein said half cell is provided with electrolyte replenishing means for replenishing electrolyte from outside of said device.

18. A fuel cell device comprising:
a fuel cell stacked body formed by stacking single cells with separator members sandwiched therebetween, each of said single cells having an electrolyte layer, an oxidant gas side electrode disposed on one side of said electrolyte layer and a fuel gas side electrode disposed on the other side of said electrolyte layer;
a positive terminal member and a negative terminal member which are disposed on the corresponding positive terminal and negative terminal which terminals are disposed along the direction of stacking said stacked body;
means for supplying an oxidant gas via a gas manifold to each single cell of said fuel cell;
electrolyte replenishing means for replenishing electrolyte to the single cell of said stacked body; and
a connecting bridge for connecting neighboring electrolyte layers of said single cells in an ion conductive manner, said connecting bridge having ion conductivity capable of transferring said electrolyte which has been replenished by said electrolyte replenishing means to said negative terminal portion.

19. A fuel cell device according to claim 18 wherein said connecting bridge retains the same type of electrolyte as that contained in said electrolyte layer of said single cell, thereby having ion conductivity.

20. A fuel cell device according to claim 18 wherein at least one of said gas manifolds has an outside manifold, and a gasket sandwiched between said gas manifold having said outside manifold and the side surface of said stacked body of fuel cell serves as a connecting bridge.

21. A fuel cell device according to claim 18 wherein said electrolyte replenishing means comprises an electrolyte reservoir disposed in said positive terminal member.

22. A fuel cell device according to claim 18 wherein said electrolyte replenishing means comprises a passage through which electrolyte is replenished, and which is disposed in said positive terminal member.

23. A fuel cell device according to claim 18 wherein said electrolyte replenishing means is an electrolyte reservoir disposed at least either of said fuel gas side electrode or said oxidant gas side electrode of a fuel cell which is located in the most positive potential side.

24. A fuel cell device according to claim 18 wherein said single cell connected to said connecting bridge and located in the most negative potential side of said fuel cell, or said negative terminal member provides an electrolyte reservoir having a function of accumulating excessive electrolyte.

25. A fuel cell according to claim 4 wherein said direct current power source is individually provided in said electrochemical circuit.

* * * * *